US008870319B2

(12) United States Patent
Maltz et al.

(10) Patent No.: US 8,870,319 B2
(45) Date of Patent: Oct. 28, 2014

(54) SYSTEM AND METHOD FOR PRINTING WITH INK LIMITING

(75) Inventors: Martin Sidney Maltz, Rochester, NY (US); Joseph Hancock, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 281 days.

(21) Appl. No.: 13/462,562

(22) Filed: May 2, 2012

(65) Prior Publication Data
US 2013/0293606 A1    Nov. 7, 2013

(51) Int. Cl.
B41J 29/38    (2006.01)

(52) U.S. Cl.
USPC ...................... 347/9; 347/5; 347/14

(58) Field of Classification Search
CPC .. B41J 2/04541; B41J 2/0458; B41J 2/04581; B41J 2/24588; B41J 2/04543
USPC ............... 347/9, 5, 6, 14, 15, 40–43
See application file for complete search history.

(56) References Cited

U.S. PATENT DOCUMENTS

| | | | |
|---|---|---|---|
| 5,633,662 A | 5/1997 | Allen et al. | |
| 5,822,502 A | 10/1998 | Li et al. | |
| 5,872,896 A | 2/1999 | Li et al. | |
| 6,084,689 A | 7/2000 | Mo | |
| 6,268,931 B1 | 7/2001 | Yamada et al. | |
| 6,302,521 B1 | 10/2001 | Ellson et al. | |
| 6,435,657 B1 | 8/2002 | Couwenhoven et al. | |
| 6,585,340 B1 | 7/2003 | Borrell | |
| 6,637,849 B2 | 10/2003 | Maltz | |
| 6,717,700 B1 | 4/2004 | Sanderson et al. | |
| 6,997,543 B2 | 2/2006 | DeBaer | |
| 7,123,380 B2 | 10/2006 | Van de Capelle | |
| 7,164,498 B2 | 1/2007 | Van Bael | |
| 7,196,817 B2 | 3/2007 | Couwenhoven et al. | |
| 7,209,145 B2 | 4/2007 | Stevens | |
| 7,209,147 B2 | 4/2007 | Edge | |
| 7,239,422 B2 | 7/2007 | Braun et al. | |
| 7,251,030 B2 | 7/2007 | Wozniak et al. | |
| 7,283,282 B2 | 10/2007 | Sanger et al. | |
| 7,307,752 B1 | 12/2007 | Mestha et al. | |
| 7,315,394 B2 | 1/2008 | Klassen et al. | |
| 7,407,242 B2 | 8/2008 | Piatt et al. | |
| 7,417,769 B2 | 8/2008 | Hasler et al. | |
| 7,495,804 B2 | 2/2009 | Rozzi | |
| 7,522,311 B2 | 4/2009 | Marsden et al. | |
| 7,533,980 B2 | 5/2009 | Bauer et al. | |
| 7,646,509 B1 | 1/2010 | Nagarajan et al. | |
| 7,847,974 B2 | 12/2010 | Dalrymple et al. | |
| 7,884,964 B2 | 2/2011 | Maltz et al. | |
| 7,889,402 B2 | 2/2011 | Chang et al. | |
| 8,040,568 B2 | 10/2011 | Lieberman et al. | |
| 8,068,256 B2 | 11/2011 | Dalal et al. | |
| 8,120,812 B2 | 2/2012 | Sharma et al. | |
| 8,144,366 B2 | 3/2012 | Tin | |

(Continued)

*Primary Examiner* — Manish S Shah
*Assistant Examiner* — Yaovi Ameh
(74) *Attorney, Agent, or Firm* — Maginot Moore & Beck LLP

(57) ABSTRACT

An inkjet printer forms ink images from image data including colors in a device independent color space. A color profile associated with the printer maps a plurality of colors in the device independent color space and to a plurality of ink colors formed from a plurality of inks in the printer. The plurality of ink colors only includes colors that are formed with an ink mass density that is below a predetermined threshold.

20 Claims, 10 Drawing Sheets

(56) References Cited

U.S. PATENT DOCUMENTS

| | | |
|---|---|---|
| 8,154,765 B2 | 4/2012 | Purdum et al. |
| 2001/0038459 A1 | 11/2001 | Mahy |
| 2002/0159083 A1 | 10/2002 | Arai et al. |
| 2003/0234943 A1 | 12/2003 | Van Bael |
| 2004/0136015 A1 | 7/2004 | Van de Capelle et al. |
| 2004/0257596 A1 | 12/2004 | Mestha et al. |
| 2005/0248598 A1 | 11/2005 | Piatt et al. |
| 2006/0012811 A1 | 1/2006 | Dalrymple et al. |
| 2006/0139705 A1 | 6/2006 | Piatt et al. |
| 2006/0280360 A1 | 12/2006 | Holub |
| 2007/0211268 A1 | 9/2007 | Sixbey et al. |
| 2007/0236759 A1* | 10/2007 | Ohga .......................... 358/518 |
| 2007/0273900 A1 | 11/2007 | Bai |
| 2007/0279442 A1 | 12/2007 | Rimai et al. |
| 2007/0279654 A1 | 12/2007 | Lin et al. |
| 2007/0291291 A1* | 12/2007 | Vilar et al. .................. 358/1.9 |
| 2008/0079967 A1 | 4/2008 | He |
| 2009/0033691 A1 | 2/2009 | Mantell et al. |
| 2009/0040261 A1 | 2/2009 | Zhang et al. |
| 2009/0296154 A1 | 12/2009 | Donaldson et al. |
| 2009/0303556 A1 | 12/2009 | Lieberman et al. |
| 2009/0315939 A1 | 12/2009 | Mantell et al. |
| 2010/0039657 A1 | 2/2010 | Wang et al. |
| 2010/0097622 A1 | 4/2010 | Qiao et al. |
| 2010/0157397 A1 | 6/2010 | Qiao |
| 2010/0182650 A1 | 7/2010 | Oicherman et al. |
| 2010/0214576 A1 | 8/2010 | Morovic et al. |
| 2010/0259794 A1 | 10/2010 | Purdum et al. |
| 2011/0058735 A1 | 3/2011 | Tastl et al. |
| 2011/0096344 A1 | 4/2011 | Morovic et al. |
| 2011/0157605 A1 | 6/2011 | Pepin et al. |
| 2011/0221804 A1 | 9/2011 | Kohne et al. |
| 2012/0026517 A1 | 2/2012 | Gross et al. |
| 2012/0086983 A1 | 4/2012 | Taylor et al. |

* cited by examiner

SYSTEM AND METHOD FOR PRINTING WITH INK LIMITING

TECHNICAL FIELD

This disclosure relates generally to color printing systems, and, more particularly, to methods for printing multi-colored images using a combination of ink colors.

BACKGROUND

A typical inkjet printer uses one or more printheads to form an ink image on an image receiving surface. Each printhead typically contains an array of individual inkjets for ejecting drops of ink across an open gap to the image receiving surface to form an ink image. The image receiving surface may be on a continuous web of recording media, a series of media sheets, or on a rotating image receiving member, such as a print drum or endless belt. Images printed on a rotating surface are later transferred to recording media by mechanical force in a transfix nip formed by the rotating member and a transfix roller. In an inkjet printhead, the inkjets include individual piezoelectric, thermal, or acoustic actuators that generate mechanical forces to expel ink through a nozzle from an ink filled pressure chamber in response to an electrical voltage signal, sometimes called a firing signal. The magnitude, frequency, and/or duration of the firing signals affect the amount of ink ejected in each drop. The firing signal is generated by a printhead controller with reference to digital image data. An inkjet printer generates firing signals with reference to the digital image data to operate the inkjets and form an ink image with individual ink drops at particular locations on the image receiving surface. The locations where the ink drops landed are sometimes called "ink drop locations," "ink drop positions," or "pixels." Thus, a printing operation can be viewed as the placement of ink drops on an image receiving surface with reference to digital image data.

Modern inkjet printers typically receive digital image data in a variety of formats and form ink images on a print medium that reproduce the original digital image. One challenge in forming printed images includes the accurate reproduction of colors in a physically printed image from the digital image data. For example, the digital image data are often not encoded in a format that is directly suitable for operating inkjets in the printer. Instead, the digital image data are often encoded in either a device-independent color space, such as L*a*b*, or are encoded in a digital format such as the red, green, blue (RGB) that is associated with display screens rather than printed images. The printer or an intermediate computing device converts the digital image data into a data format that corresponds to the ink colors that are available in the printer. One type of printer forms images using cyan, magenta, yellow, and black (CMYK) inks. The printer reproduces a wide range of colors by interspersing small drops of the basic CMYK colors on the print medium. The human eye perceives different colors from the combination of the CMYK colors. Existing standards, which include profiles from the International Color Consortium (ICC), are used to covert image data from an input color space into a color space that is used to eject ink drops from the inkjets to form the printed images.

Existing printers can print a wide range of colors in printed images using a small number of inks such as CMYK or other combinations of ink colors. A range of colors that can be represented in a color space are referred to as a "gamut" of colors. Existing printers, however, can have difficulty in reproducing some colors within the gamut of the color space. For example, reproduction of some colors in a gamut require the printer to print so many ink drops onto a media sheet that the ink would oversaturate the media sheet or would interfere with other components in the printer during a printing process.

To help prevent oversaturation, existing printers identify a coverage parameter of the printed ink and limit the amount of ink that is formed on the print medium based on the coverage parameter. The term "coverage parameter" refers to a percentage or proportion of the print medium that is perceived as being covered by ink. For example, a 100% coverage indicates that an area of the print medium is perceived as being fully covered by one type of ink. The coverage parameter can exceed 100% when multiple ink colors are printed on the same area of a print medium, such as a 200% coverage, which could include, for example, a 50% coverage of the area for each of the CMYK inks. Various ink colors have different perceptibility levels. For example, black ink on white paper is typically more perceptible than an equivalent amount of yellow ink on the same white paper. Existing printers that limit the printed ink based on the coverage density parameter print images with a narrower color gamut, and cannot reproduce certain colors. Consequently, improvements to the operation of inkjet printers to generate printed images with a wider color gamut without interfering with the operation of the printer would be beneficial.

SUMMARY

In one embodiment, a method of operating an inkjet printer with an improved color gamut has been developed. The method includes generating a first device dependent printer model that maps a plurality of colors formed from a plurality of inks in the printer and a first plurality of colors in a device independent color space, generating a second device dependent printer model that maps the plurality of colors formed from the plurality of inks and a second plurality of colors in the device independent color space with reference to the first device dependent printer model, the second device dependent printer model including only colors in the device independent color space that correspond to colors formed from the plurality of inks with an ink mass density that is below a predetermined threshold, generating a color profile mapping between the second plurality of colors in the device independent color space and the plurality of colors that are formed from the plurality of inks with an ink mass density that is below the predetermined threshold, and storing the generated color profile mapping in a memory associated with the printer.

In another embodiment, an inkjet printer that is configured to form printed images with an improved color gamut has been developed. The printer includes a plurality of inkjets arranged in a print zone and configured to form ink images with a plurality of inks on a print medium, a memory associated with the printer, and a controller operatively connected to the plurality of inkjets. The memory configured to store a color profile mapping between a plurality of colors in a device independent color space and a plurality of ink colors formed from the plurality of inks, the plurality of ink colors only including colors that are formed with an ink mass density that is below a predetermined threshold. The controller is configured to identify a plurality of colors in color image data corresponding to the device independent color space, identify a plurality of the ink colors corresponding to the plurality of colors in the color image data with reference to the color profile mapping, and operate the plurality of inkjets to eject the plurality of inks onto the print medium to form a printed ink image with the identified plurality of ink colors, the printed ink image having an ink mass density that is below the predetermined threshold.

BRIEF DESCRIPTION OF THE DRAWINGS

The foregoing aspects and other features of a printer that generates ink images with an expanded color gamut are explained in the following description, taken in connection with the accompanying drawings.

DETAILED DESCRIPTION

Figure 1:
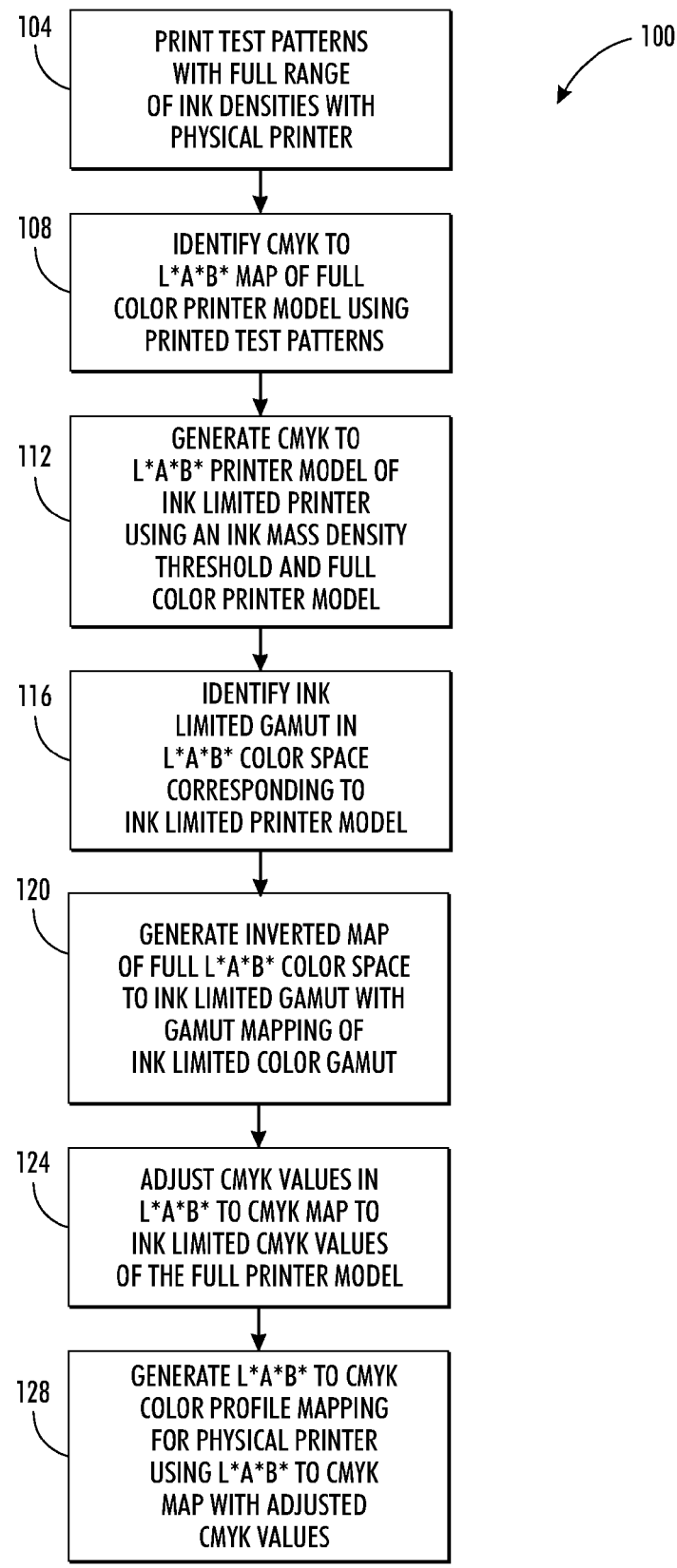
FIG. 1 is a block diagram of a process for generating a profile that maps a device independent color space to a subset of ink colors that the printer can print with each color having an ink mass density below a predetermined limit.

For a general understanding of the environment for the system and method disclosed herein as well as the details for the system and method, reference is made to the drawings. In the drawings, like reference numerals have been used throughout to designate like elements. As used herein, the word "printer" encompasses any apparatus that produces images with colorants on media, such as digital copiers, bookmaking machines, facsimile machines, multi-function machines, etc.

As used herein, the term "color space" refers to a numeric space used to describe a plurality of colors. Examples of color spaces include L*a*b*; and red, green, blue (RGB) color spaces. One particular example of an RGB color space is the "standard RGB" (sRGB) color space that is used in many applications including digital imaging and display using LCD display panels and other display devices. A color is typically identified with multiple numeric component values taken from each of a plurality of axes in the color space. For example, a color is represented as a coordinate with numeric value for each of the L* (lightness), a* (green-magenta), and b* (blue-yellow) axes in the color space. Similarly, a color is represented by three numeric values corresponding to red, green, and blue component values in an RGB space. When viewed as a multi-dimensional space, each set of coordinates in the color space corresponds to a single color. A single color that is represented in one color space can be mapped to a similar or equivalent color in another color space using transformation techniques that are known to the art.

A subset of a color space is referred to as a "color gamut." An imaging device, such as a printer, can generate images with colors in a particular color gamut of the color space. The color space is typically larger than the color gamut that can be reproduced by a particular printer. A color gamut can be represented visually as a three dimensional volume in the color space, with points on the surface and interior of the volume corresponding to colors that the printer can reproduce, and points outside of the volume corresponding to colors that the printer cannot reproduce. A color in the color space that is outside the gamut can be associated with a color in the gamut that has a similar hue value to enable the printer to print approximations of colors that are outside of the gamut with minimal distortion to the out-of-gamut colors. An out-of-gamut color can be mapped to a color on the outer surface of the gamut, which corresponds to the color space coordinates defining the outer boundary of the color space that can be reproduce by the printer.

As used herein, the terms "color printer model" and "printer model" are used interchangeably and refer to a relationship between colors that a printer can reproduce with reference to different combinations of physical marking agents, such as different inks, and the perceived colors of the resulting marks in a device independent color space. Different types of printers have different device dependent printer models, and even different instances of the same type of printer can have different device dependent printer models due to variations in the operating characteristics of the individual printing devices. An exemplary printer model described herein is directed to a printer that forms ink images with cyan, magenta, yellow, and black (CMYK) inks, typically on a paper substrate with a white color. The printer model can include multi-dimensional lookup tables (LUTs) or other data structures that store data corresponding to the CMYK ink colors used in the printer and mapping the CMYK ink colors to perceived colors in a device independent color space such as the L*a*b* or sRGB color spaces.

A "full color" printer model refers to a printer model that includes all of the possible combinations of inks mapped to the device independent color space. The full printer model typically corresponds to a physical printing device such as an inkjet printer. In some configurations, the full printer model includes some CMYK LUT indices corresponding to CMYK colors that are printed with an ink density that is too large for practical use during regular printing operations. A printer model that corresponds to an "ink limited" printer, also referred to as an "ink limited printer model", refers to a CMYK to L*a*b* LUT for a printer that can only form ink images using CMYK inks having a limited ink mass density. The ink limited printer model LUT includes the full range of possible CMYK index values that are included in the full color printer model. The device independent color values held in the ink limited printer model LUT, however, only correspond to the colors in the device independent space that can be produced by constraining the actual ink mass density of the printed ink to within a predetermined maximum limit. The ink limited printer model can correspond to a specially configured physical printer that only prints ink images within a limited range ink densities, or to a so-called "pseudo" printer that is not implemented as a physical device, but has operating characteristics that can be emulated by reconfiguring a physical printer.

As used herein, the terms "color component" and "color component values" refer to numeric values corresponding to an amount of a particular ink that a printer uses to reproduce a selected color in the device specific printer model. In an exemplary CMYK printer with 8 bit resolution for each ink color, the cyan, magenta, yellow, and black colors are each assigned a numeric value such as an integer value of between 0 and 255. The printer ejects ink drops using each of the CMYK inks in proportion to the numeric color component value. For example, the printer ejects different amounts of inks in combination with reference to values of C=50, Y=130, M=0, and K=40. In the example color, the magenta color component value is zero, so the printer does not use any magenta ink to form the color. The printer prints the cyan, yellow, and black inks in proportion to the numeric color component values of the other inks, with yellow ink being printed in the largest amount for the example color. Alternative printer embodiments use integer or floating point numbers with lower or higher resolutions to represent color components. For example, in one alternative embodiment each color component value is represented as a percentage value between 0% and 100%.

The colors in image data that a printer processes during a print job are expressed in the color coordinates of a device independent color space such as the sRGB or L*a*b* color space. In order to print images with the colors defined in image data, the color coordinates of the device independent colors need to be converted into the color component values corresponding to ink colors of the printer producing the ink image. Printers include color profiles mappings, such as international color consortium (ICC) profiles, which map colors in a device independent color space to the ink colors used by the printer. A color profile mapping and a printer model can be related to each other since a printer model maps ink colors used by the printer to the device independent color space, and the color profile maps colors from the device independent color space to ink colors used by the printer.

A reference to a gamut of a particular printer refers to colors in the device independent color space that correspond to the device independent colors that are included in the printer model. As described above, since the printer model and associated color gamut typically includes fewer colors than are present in a larger color space, various transformation techniques are used in existing printers to map colors in the color space to the narrower color gamut. Identified colors in the color gamut are then converted to colors in the printer model using the color profile mapping to control the ejection of different colored ink drops to reproduce the color.

As used herein, the term "ink mass density" refers to a density of ink formed on a print medium, such as paper, in order to reproduce a particular color in the printer model. The ink mass density refers to the density of ink on the paper for printing a solid area of the color over a comparatively large portion of the print medium. For example, the ink mass density of a particular color is 4 milligrams (mg) per square inch when a continuous area of the print medium is printed with one or more inks that form the color on the print medium. In an inkjet printer, if the ink mass density on the print medium exceeds a predetermined operating limit, then the print medium may jam or ink may offset from the print medium as the printer handles the print medium. The terms "ink mass density limit" and "ink mass density threshold" are used interchangeably and refer to a maximum ink mass density that a printer is configured to use during operation. Processes that are described below generate a profile to a corresponding device independent color gamut based on an ink mass density limit so that the printer prints a wide range of colors while preventing an over-accumulation of ink on the print medium.

Figure 4A:
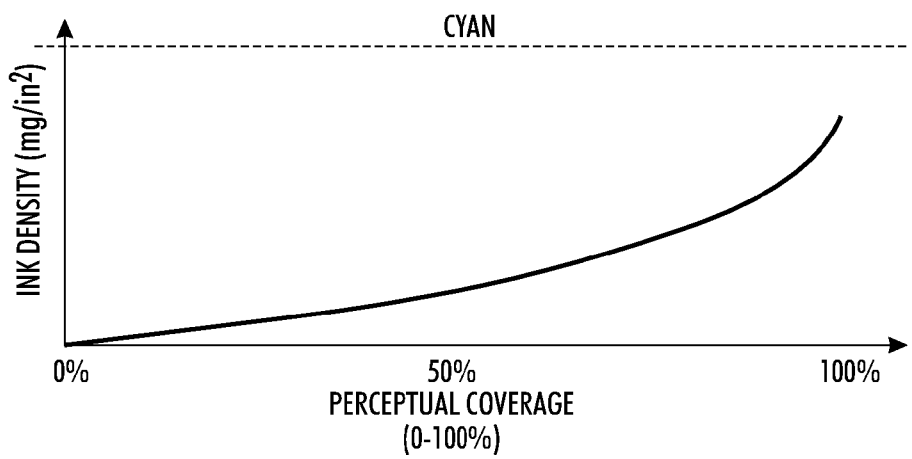
FIG. 4A is an exemplary diagram of a relationship between a perceived area coverage of cyan ink and an ink mass density of the cyan ink that generates the perceived area coverage when formed on a print medium.
Figure 4B:
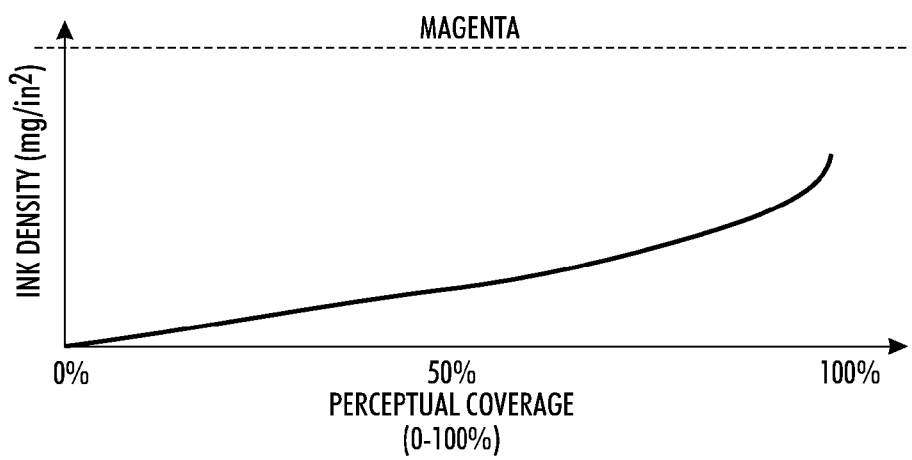
FIG. 4B is an exemplary diagram of a relationship between a perceived area coverage of magenta ink and an ink mass density of the magenta ink that generates the perceived area coverage when formed on a print medium.
Figure 4C:
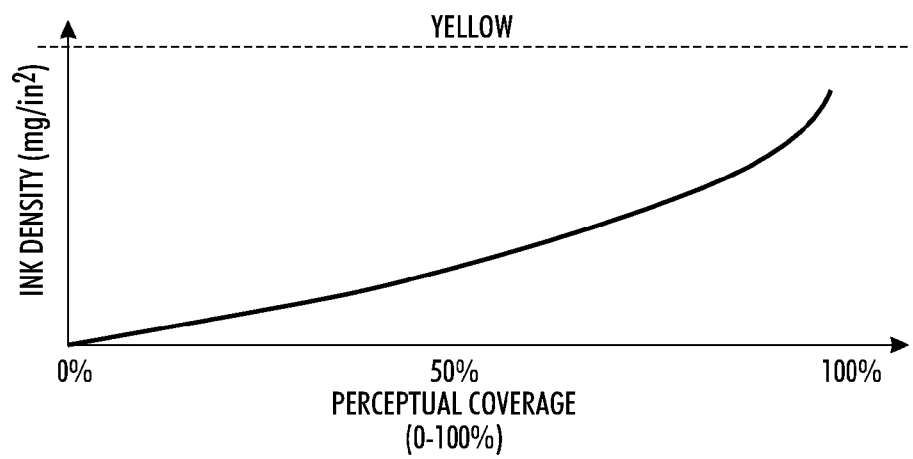
FIG. 4C is an exemplary diagram of a relationship between a perceived area coverage of yellow ink and an ink mass density of the yellow ink that generates the perceived area coverage when formed on a print medium.
Figure 4D:
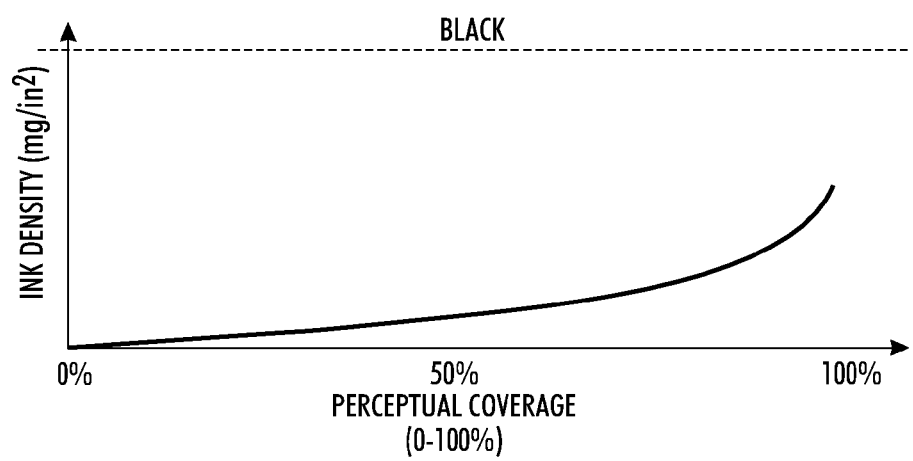
FIG. 4D is an exemplary diagram of a relationship between a perceived area coverage of black ink and an ink mass density of the black ink that generates the perceived area coverage when formed on a print medium.

The color component values correspond to an amount of ink that a printer prints during operation to produce an ink with a certain ink mass density. The relationship between perceived color on a printed page and the ink mass density is, however, non-linear. As exemplified in FIG. 4A-4D, the perceptual coverage percentage for each of the CMYK inks has a non-linear relationship with reference to the mass density of ink on a print medium. For each type of ink, the marginal amount of ink that is required to increase the perceived coverage area percentage increases with the desired coverage area percentage. For example, in FIG. 4C, the ink density of yellow ink at a 50% coverage is approximately one-third of the ink density required to reach 100% coverage. Additionally, the perceptual coverage percentages of different ink colors are relative to each color and vary between colors. For example, if a printer prints a maximum density of yellow ink on a print medium then absolute perceptibility of the yellow ink can still be less perceptible than a lower density of black ink on the same print medium. The differences in perceptual coverage are influenced, at least in part, by the response of the human eye to different colors and to contrast between the colors of the ink and the underlying print medium.

Figure 7:
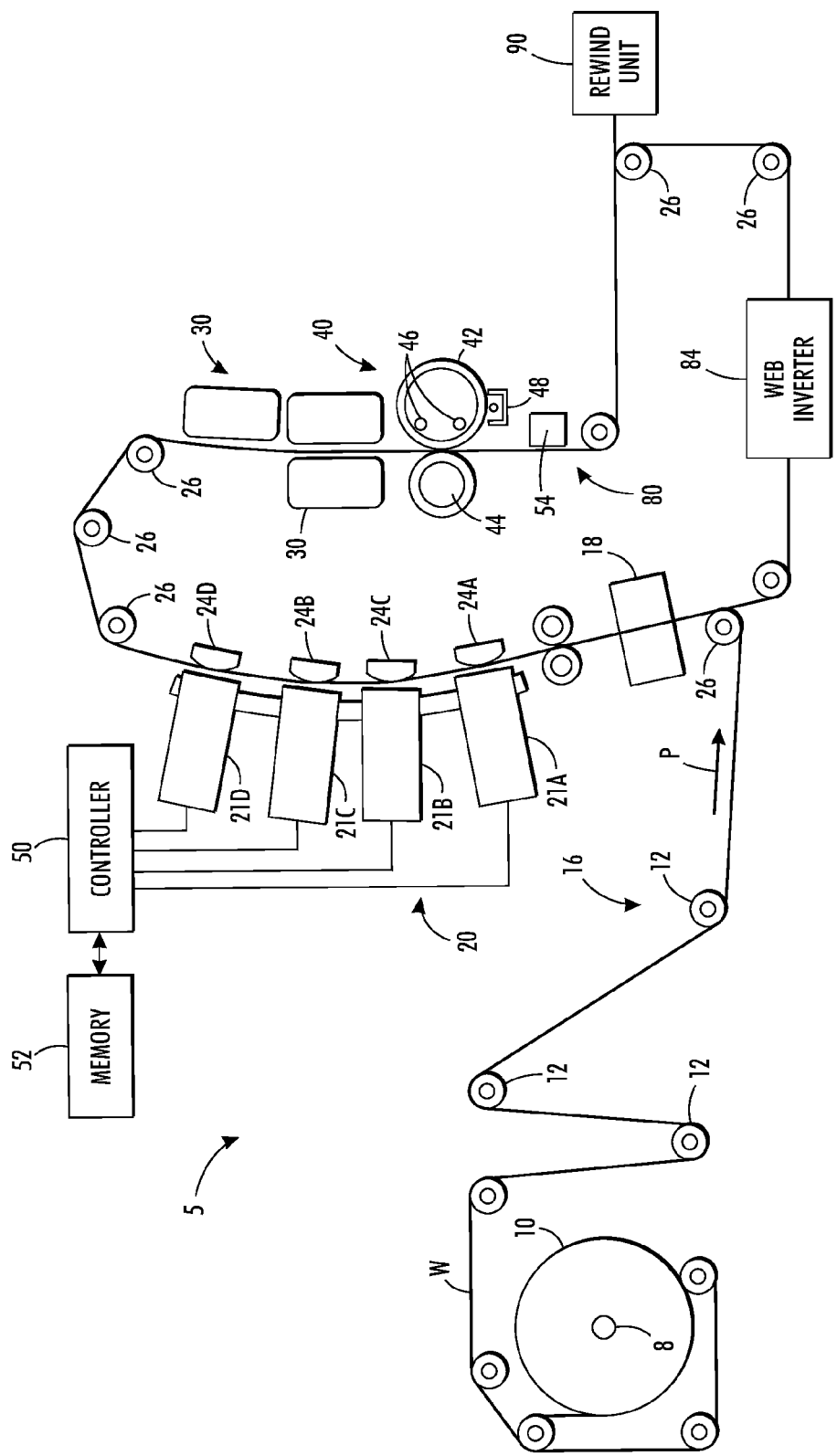
FIG. 7 is a prior art schematic diagram of a continuous web inkjet printer that is configured to use the ink limited color gamuts described herein.

FIG. 7 depicts a prior-art inkjet printer 5. For the purposes of this disclosure, an inkjet printer employs one or more inkjet printheads to eject drops of ink into an image receiving member, such as paper, another print medium, or an indirect member such as a rotating image drum or belt. The printer 5 is configured to print ink images with a "phase-change ink," by which is meant an ink that is substantially solid at room temperature and that transitions to a liquid state when heated to a phase change ink melting temperature for jetting onto the imaging receiving member surface. The phase change ink melting temperature is any temperature that is capable of melting solid phase change ink into liquid or molten form. In one embodiment, the phase change ink melting temperature is approximately 70° C. to 140° C. In alternative embodiments, the ink utilized in the printer comprises UV curable gel ink. Gel inks are also heated before being ejected by the inkjet ejectors of the printhead. As used herein, liquid ink refers to melted phase change ink, heated gel ink, or other forms of ink, such as aqueous inks, ink emulsions, ink suspensions, ink solutions, or the like.

The printer 5 includes a controller 50 to process the image data before generating the control signals for the inkjet ejectors to eject colorants. Colorants can be ink, or any suitable substance that includes one or more dyes or pigments and that is applied to the selected media. The colorant can be black, or any other desired color, and some printer configurations apply a plurality of distinct colorants to the media. In the configuration of FIG. 7, the printer 5 ejects cyan, magenta, yellow, and black (CMYK) inks onto the media web to form color ink images. The media includes any of a variety of substrates, including plain paper, coated paper, glossy paper, or transparencies, among others, and the media can be available in sheets, rolls, or other physical formats.

The printer 5 is an example of a direct-to-sheet, continuous-media, phase-change inkjet printer that includes a media supply and handling system configured to supply a long (i.e., substantially continuous) web of media W of "substrate" (paper, plastic, or other printable material) from a media source, such as spool of media 10 mounted on a web roller 8. For simplex printing, the printer 5 passes the media web W through a media conditioner 16, print zone 20, printed web conditioner 80, and rewind unit 90 once. In the simplex operation, the media source 10 has a width that substantially covers the width of the rollers over which the media travels through the printer.

For duplex operations, the web inverter 84 flips the media web W over to present a second side of the media to the print zone 20 and printed web conditioner 80, before being taken up by the rewind unit 90. In duplex operation, the media source is approximately one-half of the roller widths as the web travels over one-half of the surface of each roller 26 in the print zone 20 and printed web conditioner 80. The inverter 84 flips and laterally displaces the media web W and the media web W subsequently travels over the other half of the surface of each roller 26 opposite the print zone 20 and printed web conditioner 80, for printing and conditioning of the reverse side of the media web W. The rewind unit 90 is configured to wind the web onto a roller for removal from the printer and subsequent processing.

In another duplex printing configuration, two printers with the configuration of the printer 5 are arranged serially with a web inverter interposed between the two printers to perform duplex printing operations. In the serial printing arrangement, the first printer forms and fixes an image on one side of a web, the inverter turns the web over, and the second printer forms and fixes an image on the second side of the web. In the serial duplex printing configuration, the width of the media web W can substantially cover the width of the rollers in both printers over which the media travels during duplex printing.

The media web W is unwound from the source 10 as needed and a variety of motors, not shown, rotate one or more rollers 12 and 26 to propel the media web W. The media conditioner includes rollers 12 and a pre-heater 18. The rollers 12 and 26 control the tension of the unwinding media as the media moves along a path through the printer. In alternative embodiments, the printer transports a cut sheet media through the print zone in which case the media supply and handling system includes any suitable device or structure to enable the transport of cut media sheets along a desired path through the printer. The pre-heater 18 brings the web to an initial predetermined temperature that is selected for desired image characteristics corresponding to the type of media being printed as well as the type, colors, and number of inks being used. The pre-heater 18 can use contact, radiant, conductive, or convective heat to bring the media to a target preheat temperature, which in one practical embodiment, is in a range of about 30° C. to about 70° C.

The media is transported through a print zone 20 that includes a series of color printhead modules or units 21A, 21B, 21C, and 21D, each printhead unit effectively extends across the width of the media and is able to eject ink directly (i.e., without use of an intermediate or offset member) onto the moving media. In printer 5, each of the printheads ejects a single color of ink, one for each of the colors typically used in color printing, namely, cyan, magenta, yellow, and black (CMYK) for printhead units 21A, 21B, 21C, and 21D, respectively. The controller 50 of the printer receives velocity data from encoders mounted proximately to rollers positioned on either side of the portion of the path opposite the four printheads to calculate the linear velocity and position of the web as the web moves past the printheads. The controller 50 uses these data to generate firing signals for actuating the inkjet ejectors in the printheads to enable the printheads to eject four colors of ink with appropriate timing and accuracy for registration of the differently colored patterns to form color images on the media. The inkjet ejectors actuated by the firing signals correspond to digital data processed by the controller 50. The digital data for the images to be printed can be transmitted to the printer, generated by a scanner (not shown) that is a component of the printer, or otherwise generated and delivered to the printer. In various configurations, a color module for each primary color includes one or more printheads; multiple printheads in a module are formed into a single row or multiple row array; printheads of a multiple row array are staggered; a printhead prints more than one color; or the printheads or portions thereof are mounted movably in a direction transverse to the process direction P for printing operations, such as for spot-color applications and the like. While the printhead units in the printer 5 are configured to eject liquid drops of a phase change ink onto the media web W, a similar configuration of inkjets that print solvent inks, aqueous inks, or any other liquid ink can be used to generate color ink images as described herein.

Associated with each color module is a backing member 24A-24D, typically in the form of a bar or roll, which is arranged substantially opposite the printhead on the back side of the media. Each backing member positions the media at a predetermined distance from the printhead opposite the backing member. The backing members 24A-24D are optionally configured to emit thermal energy to heat the media to a predetermined temperature, which is in a range of about 40° C. to about 60° C. in printer 5. The various backer members can be controlled individually or collectively. The pre-heater 18, the printheads, backing members 24A-24D (if heated), as well as the surrounding air combine to maintain the media along the portion of the path opposite the print zone 20 in a predetermined temperature range of about 40° C. to 70° C.

As the partially-imaged media web W moves to receive inks of various colors from the printheads of the print zone 20, the printer 5 maintains the temperature of the media web within a given range. The printheads in the color modules 21A-21D eject ink at a temperature typically significantly higher than the temperature of the media web W. Consequently, the ink heats the media, and temperature control devices can maintain the media web temperature within a predetermined range. For example, the air temperature and air flow rate behind and in front of the media web W impacts the media temperature. Accordingly, air blowers or fans can be utilized to facilitate control of the media temperature. Thus, the printer 5 maintains the temperature of the media web W within an appropriate range for the jetting of all inks from the printheads of the print zone 20. Temperature sensors (not shown) can be positioned along this portion of the media path to enable regulation of the media temperature.

Following the print zone 20 along the media path are one or more "mid-heaters" 30. A mid-heater 30 can use contact, radiant, conductive, and/or convective heat to control a temperature of the media. The mid-heater 30 brings the ink placed on the media to a temperature suitable for desired properties when the ink on the media is sent through the spreader 40. In one embodiment, a useful range for a target temperature for the mid-heater is about 35° C. to about 80° C. The mid-heater 30 has the effect of equalizing the ink and substrate temperatures to within about 15° C. of each other. Lower ink temperature gives less line spread while higher ink temperature causes show-through (visibility of the image from the other side of the print). The mid-heater 30 adjusts substrate and ink temperatures to 0° C. to 20° C. above the temperature of the spreader.

Following the mid-heaters 30, a fixing assembly 40 applies heat and/or pressure to the media to fix the images to the media. The fixing assembly includes any suitable device or apparatus for fixing images to the media including heated or unheated pressure rollers, radiant heaters, heat lamps, and the like. In the embodiment of the FIG. 7, the fixing assembly includes a "spreader" 40, that applies a predetermined pressure, and in some implementations, heat, to the media. The function of the spreader 40 is to flatten the individual ink droplets, strings of ink droplets, or lines of ink on web W and flatten the ink with pressure and, in some systems, heat. The spreader flattens the ink drops to fill spaces between adjacent drops and form uniform images on the media web W. In addition to spreading the ink, the spreader 40 improves fixation of the ink image to the media web W by increasing ink layer cohesion and/or increasing the ink-web adhesion. The spreader 40 includes rollers, such as image-side roller 42 and pressure roller 44, to apply heat and pressure to the media. Either roller can include heat elements, such as heating elements 46, to bring the web W to a temperature in a range from about 35° C. to about 80° C. In alternative embodiments, the fixing assembly spreads the ink using non-contact heating (without pressure) of the media after the print zone 20. Such a non-contact fixing assembly can use any suitable type of heater to heat the media to a desired temperature, such as a radiant heater, UV heating lamps, and the like.

In one practical embodiment, the roller temperature in spreader 40 is maintained at an optimum temperature that depends on the properties of the ink, such as 55° C. Generally, a lower roller temperature gives less line spread while a higher temperature produces imperfections in the gloss of the ink image. Roller temperatures that are too high may cause ink to offset to the roll. In one practical embodiment, the nip pressure is set in a range of about 500 to about 2000 psi lbs./side. Lower nip pressure produces less line spread while higher pressure may reduce pressure roller life.

The spreader 40 can include a cleaning/oiling station 48 associated with image-side roller 42. The station 48 cleans and/or applies a layer of some release agent or other material to the roller surface. The release agent material can be an amino silicone oil having viscosity of about 10-200 centipoises. A small amount of oil transfers from the station to the media web W, with the printer 5 transferring approximately 1-10 mg per A4 sheet-sized portion of the media web W. In one embodiment, the mid-heater 30 and spreader 40 are combined into a single unit, with their respective functions occurring relative to the same portion of media simultaneously. In another embodiment the media is maintained at a high temperature as the media exits the print zone 20 to enable spreading of the ink.

Following passage through the spreader 40 the printed media can be wound onto a roller for removal from the system (simplex printing) or directed to the web inverter 84 for inversion of the print medium and displacement to another section of the rollers for a second pass by the printheads, mid-heaters, spreader, and coating station. One configuration of the printer 5 winds the simplex or duplex printed media onto a roller for removal from the system by rewind unit 90. Alternatively, the media can be directed to other processing stations that perform tasks such as cutting, binding, collating, and/or stapling the media or the like.

In printer 5, a controller 50 is operatively connected to various subsystems and components to regulate and control operation of the printer 5. The controller 50 is implemented with general or specialized programmable processors that execute programmed instructions. A memory 52 stores programmed instructions and also stores various data used in the configuration and operation of the printer 5. As described below, the memory 52 holds one or more LUTs that store data corresponding to combinations of the CMYK inks that the printer 5 forms on the media web W, and corresponding color coordinates in one or more color spaces such as L*a*b* and sRGB color spaces. In one embodiment, the data are stored as international color consortium (ICC) profiles. The instructions and data required to perform the programmed functions are stored in a memory associated with the processors or controllers. The processors, their memories, and interface circuitry configure the controllers and/or print engine to perform the printer operations. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits. The controller 50 is operatively connected to the print bar and printhead motors of color modules 21A-21D in order to generate electrical firing signals for operation of the inkjets to form ink images on the media web W.

The printer 5 includes an optical sensor 54 that is configured in a manner similar to that described above for the imaging of the printed web. The optical sensor is configured to detect, for example, the presence, reflectance values, and/or location of ink drops jetted onto the receiving member by the inkjets of the printhead assembly. The optical sensor 54 includes an array of optical detectors mounted to a bar or other longitudinal structure that extends across the width of an imaging area on the image receiving member. In one embodiment, the optical sensor 54 includes a spectrophotometer that detects light reflected from ink marks that are printed on the media web W using one or more colors of the CMYK inks in a range of densities. The spectrophotometer 54 generates digital data corresponding to the spectra and colors of light reflected from the ink patches, and the controller 50 identifies the correspondence between the data from the spectrophotometer 54 and colors in a device independent color space such as the sRGB or L*a*b* color space. The magnitudes of the electrical signals generated by the optical detectors are converted to digital values by an appropriate analog/digital converter.

The imaging system 5 of FIG. 7 is merely illustrative of one embodiment of an imaging system that forms ink images on a print medium using a device dependent color gamut. Alternative imaging systems include, but are not limited to sheet fed imaging systems, indirect inkjet printers that form latent ink images on a drum or belt prior to transferring the ink image to a print medium, and inkjet printers that use liquid inks instead of phase change inks.

FIG. 1 depicts a process 100 for generating a color profile that maps between a device independent color space and a subset of ink colors that a printer can reproduce with an ink mass density that is below a predetermined limit. FIG. 1 refers to the L*a*b* color space as the device independent color space and to a physical printer that uses CMYK inks to form color printed images as illustrative examples. Process 100 can also be used with different device independent color spaces and printers that use different ink color combinations. In the discussion below, a reference to the process performing a function or action refers to a controller executing programmed instructions stored in a memory to operate one or more components to perform the function or action. Process 100 is described with reference to the printer 5 of FIG. 7 for illustrative purposes.

Process 100 begins by printing a pattern of ink marks with a full range of ink densities in various combinations (block 104). In one embodiment, the test patterns include test patches formed by a plurality of inkjets in one or more of the printhead units 21A-21D. The test patches include both single color patches formed with a single color of ink at various perceptible coverage levels and multi-ink patches formed with range of ink combinations using two or more of the CMYK inks. In one configuration, the printer 5 forms approximately 2,000 test patches on the media web W, including patches with ink mass densities that are larger than an ink mass density limit that is suitable for use during regular printing operations.

In process 100, the controller 50 in printer 5 or another computing device identifies a full color printer model with reference to optical data corresponding to the printed test patches and with reference to the ink mass density of ink test patches formed on the print medium (block 108). In the printer 5, the optical sensor 54 detects the light spectrum reflected from each of the ink test patches. The controller 50 stores data corresponding to the light spectra in association with the predetermined combination of inks that generated each test patch. These data can be used later to identify perceived colors in a device independent color space that correspond to the ink formed on the print medium. The full color printer model can be represented as a four-dimensional lookup table (LUT) with the CMYK color component values being indices in the LUT. Each entry in the full color printer model LUT is an L*a*b* coordinate that corresponds to a perceivable color in the L*a*b* color space that is generated with the corresponding combination of CMYK ink colors. The device independent color gamut corresponding to the full color range of inks that the printer can produce is identified using a geometry based process that is known to the art. As described in more detail below, the full color printer model includes some CMYK ink combinations having an ink density that is too great for practical use during printing. Process 100 identifies a color profile mapping between the L*a*b* color space and a subset of the CMYK inks that can be printed with an ink mass density that is less than the predetermined limit for the physical printer 5.

In the example of the printer 5, the controller 50 stores a multi-dimensional LUT, which maps numeric values corresponding to the CMYK color components in each test patch to coordinates in the L*a*b* color space in the memory 52. The full color printer model maps between the physical printed ink on the print medium and the perceived color that the printer reproduces using coordinates in the L*a*b* color space. The memory 52 can also store a color profile, such as an international color consortium (ICC) color profile, including a plurality of ink color formulations associated with the device independent colors in the printer model. In an ink limited color profile, the ink color formulations are all selected to have an ink mass density that is below the predetermined operating limit for the printer.

Process 100 continues by generating a printer model corresponding to an ink limited printer with reference to the full color printer model and the identified ink mass densities for colors in the full color printer model (block 112). The ink limited printer model is another LUT that maps CMYK to L*a*b* coordinates, with the LUT including the same CMYK coordinates that are represented in the full color printer model. The ink limited printer model, however, maps to different coordinates in the L*a*b* color space when a the CMYK value in the full color printer model corresponds to a combination of CMYK inks that have an ink mass density exceeding the predetermined ink mass density limit for the printer.

For example, one full color LUT includes four dimensions of 13 elements each, for a total of 28,561 ($13^4$) entries, which corresponds to different color component values for each of the CMYK colors. Each entry contains corresponding coordinates in the L*a*b* color space that correspond to a perceived color of the combination of the CMYK inks at the LUT coordinates. A much larger number of colors can be identified by interpolating between entries in the full color printer model, so the LUT does not need to contain a separate entry for each color that the printer can reproduce. The ink limited LUT includes the same 28,561 entries corresponding to the same CMYK values, but the L*a*b* values of some of the CMYK entries may be different from the full color printer model when the full color printer model would use a combination of CMYK inks that exceeds the predetermined ink mass density limit for the printer. As described below, an ink limiting transformation identifies alternative L*a*b* values that correspond to ink combinations that the printer 5 can reproduce, while minimizing the distortion to the color of the original ink combination.

Figure 2:
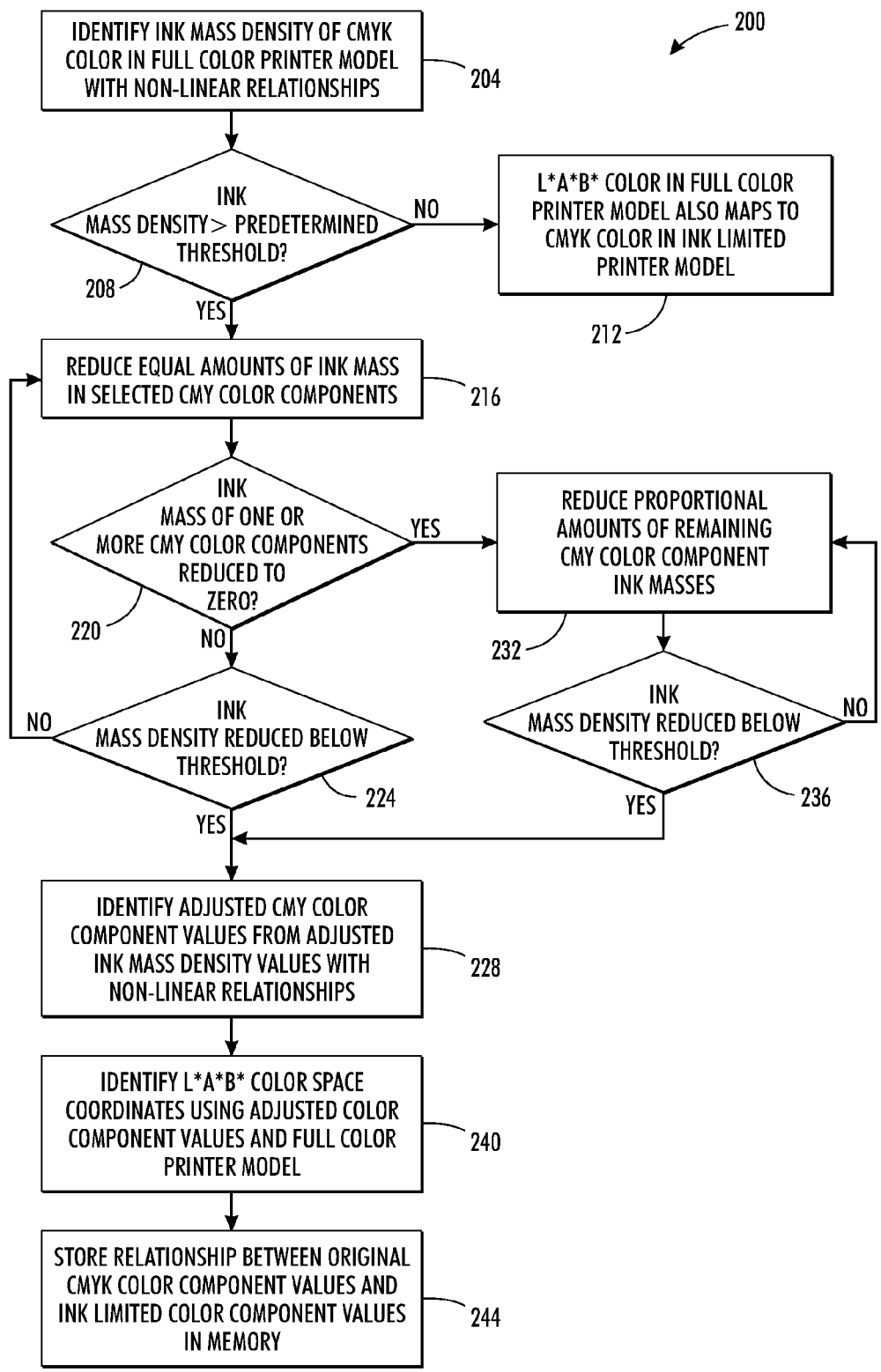
FIG. 2 is a block diagram of a process for mapping colors in a full color printer model to colors in an ink limited printer model for an inkjet printer.

FIG. 2 depicts the processing of block 112 in more detail. FIG. 2 depicts a process 200 for identifying L*a*b* values for the ink limited printer model using the full color printer model and an ink limiting transformation that modifies CMYK colors that exceed the predetermined ink mass density limit for the printer. In the discussion below, a reference to the process performing a function or action refers to a controller executing programmed instructions stored in a memory to operate one or more components to perform the function or action, such as the controller 50 in the printer 5. Process 200 is described with reference to the printer 5 of FIG. 7 for illustrative purposes. Process 200 minimizes distortions to the hue of the colors during the ink limiting transformation. FIG. 2 depicts the process for identifying the L*a*b* value for a single CMYK color in the ink limited printer model, but process 200 is performed multiple times to generate an ink limited L*a*b* value for each CMYK color in the ink limited printer model.

Process 200 begins by identifying the ink mass density of one CMYK color in the full color printer model (block 204). In one embodiment, the ink mass density can be identified using data corresponding to the non-linear relationships for the CMYK colors that are stored in the memory 52. FIG. 4A-FIG. 4D depict exemplary non-linear relationships for CMYK inks used in the printer 5. The color component values for the color in the full color printer model correspond to perceived percentage area coverage values, and the printer identifies the ink mass density as the sum of the ink mass densities for the individual CMYK color component values. Process 200 changes the individual ink mass densities of the CMYK color components that can be changed during an ink limiting transformation.

Figure 5A:
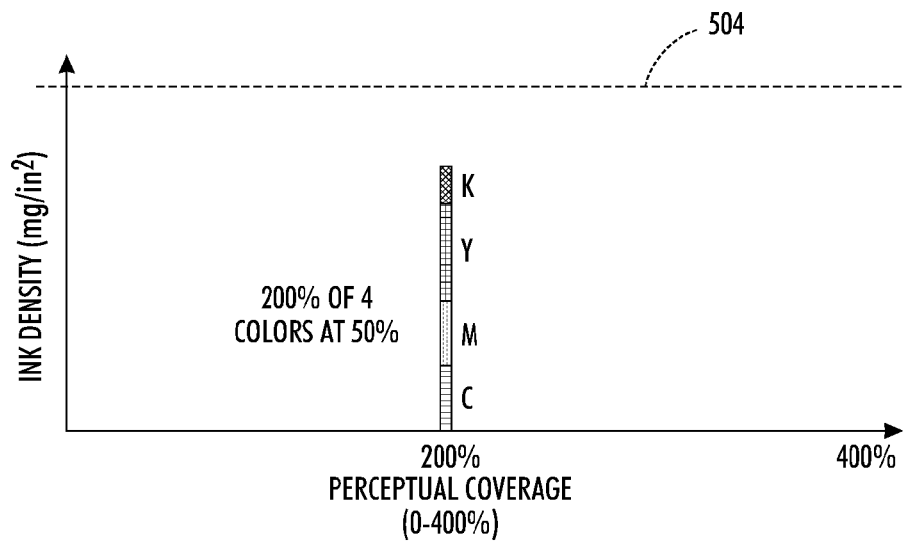
FIG. 5A is an exemplary diagram depicting an ink mass density for a color formed using cyan, magenta, yellow, and black inks.
Figure 5B:
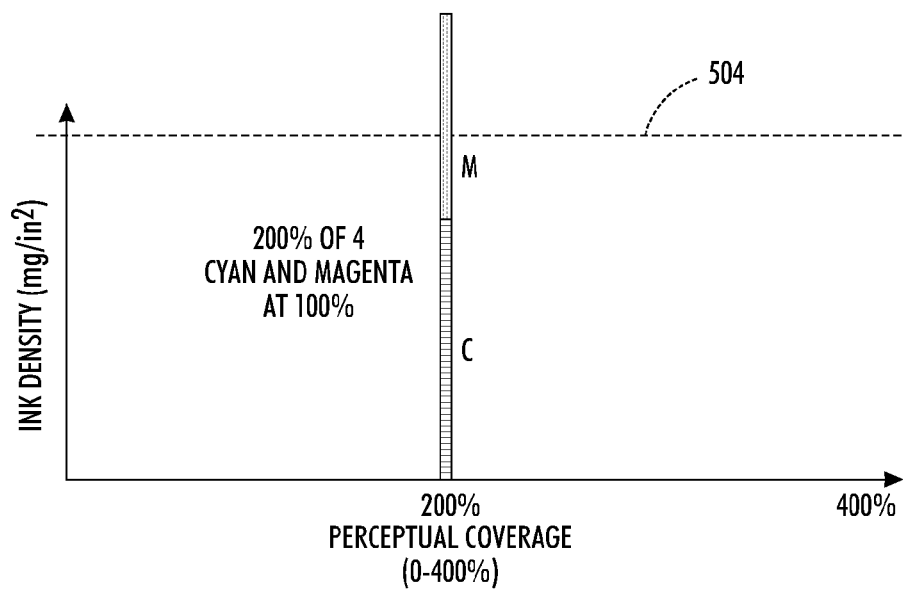
FIG. 5B is an exemplary diagram depicting an ink mass density for another color formed using cyan and magenta inks.

The ink mass density threshold only limits the total mass of ink used to form a color, and does not distinguish between different ink colors or limits the total mass of ink based on the perceived area coverage percentage value. For example, as depicted in FIG. 5A, one color includes a perceptual coverage of 200% with components from each of the CMYK colors. The ink mass density of the color is below the predetermined ink mass density threshold for the printer. In FIG. 5B, however, another color that also has 200% coverage formed from only cyan and magenta inks exceeds the predetermined ink mass density threshold. The individual ink mass densities for the color components correspond to the non-linear relationships that are depicted in FIG. 4A-FIG. 4D.

If the ink mass density does not exceed the predetermined threshold (block 208), then the L*a*b* color value corresponding to the selected CMYK color in the full color printer model is placed in the same CMYK element in the ink limited printer model without modification (block 212). In one configuration of the printer 5, the predetermined ink mass density threshold is approximately 5.6 mg/in$^2$. The ink mass density threshold can vary, however, based on the properties of the print medium, inks, operating environment, and other operating parameters of the printer. If the sum of the ink mass densities for the CMYK color components in the full color printer model are less than the threshold, then the CMYK combination can also be reproduced by an ink limited printer, and the same CMYK to L*a*b* mapping is present in the ink limited printer model.

If the ink mass density of the color exceeds the predetermined threshold (block 208), then process 200 modifies the color from the full color printer model to a corresponding color in the ink limited printer model. First, process 200 reduces the identified mass density of each ink for selected color components by equal amounts (block 216). In one configuration, if a CMYK color has ink mass density values of C=1.8 mg/in$^2$, M=2.2 mg/in$^2$, Y=2.5 mg/in$^2$, and K=0.6 mg/in$^2$, then process 200 reduces each of the CMY values by an equal increment of 0.1 mg/in$^2$ to produce C=1.7 mg/in$^2$, M=2.1 mg/in$^2$, Y=2.4 mg/in$^2$, and K=0.6 mg/in$^2$. The K ink mass density value, corresponding to black ink, remains unchanged in process 200. The CMY ink density values are each reduced by equal amounts to lighten the color, which reduces the amount of ink used to generate the color, while also preserving the hue of the color. For example, if a color appears to have a green hue, then the lightening process converts a darker green color to a lighter green color, but does not substantially move the hue of the green color toward another color, such as orange, in the color space.

In one configuration, process 200 reduces the ink mass density values for the CMY color components iteratively until either one or more color components is reduced to zero (block 220) or until the ink mass density of the generated color drops below the predetermined ink limit threshold (block 224). If the total CMYK ink mass density for the color is below the predetermined threshold, then process 200 performs the processing described in block 228 below. For some CMYK ink combinations, the ink mass density of one of the CMY inks reaches zero while the total ink mass density remains above the predetermined threshold (block 220). In this situation, process 200 reduces the remaining ink mass densities proportionally until the ink mass density of the modified color is below the predetermined threshold (block 232). For example, if a modified CMY color includes ink mass density values of C=0 mg/in$^2$, M=2.2 mg/in$^2$, Y=2.5 mg/in$^2$, then the M and Y values are reduced by a predetermined percentage, such as 5%, to produce component values of C=0, M=2.09 mg/in$^2$, and Y=2.38 mg/in$^2$. The proportional reductions to the non-zero ink mass density values correspond to decreasing in the saturation of the CMYK color, while minimizing changes to the hue of the color. Process 200 can iteratively decrease the ink mass densities of the remaining color channels until the modified color is below the predetermined ink mass density threshold (block 236).

Once process 200 identifies a CMYK ink combination with a total ink mass density that is below the predetermined ink limit, process 200 identifies CMYK color component values for the ink masses by reversing the non-linear relationships between the ink mass density and color component values (block 228). The identified CMYK value includes reduced CMY components from the original CMYK value. For example, original CMYK$_O$ color component values of C=255, M=255, Y=255, and K=255 could be reduced to limited CMYK$_L$ values C=100, M=100, Y=100, and K=255 after reducing the ink mass values for the CMY color components.

Process 200 identifies an L*a*b* value in the full color printer model at the ink limited CMYK$_L$ entry in the LUT of the full color printer model and inserts the L*a*b* value into the ink limited printer model at the entry CMYK$_O$ of the original CMYK color value that is provided to process 200 (block 240). Consequently, the ink limited printer model includes a LUT with the same range of CMYK values as the LUT of the full color printer model, but the mapped L*a*b* values from the ink limited printer model are selected to correspond only to CMYK ink combinations in the full color printer model that can be reproduced using CMYK inks with an ink mass density that is below the predetermined limited for the printer 5. In the printer 5, the color component values corresponding to the ink limited printer model are stored in the memory 52 in association with the color component values from the full color printer model.

Process 200 can optionally cache a hash table or other data structure that maps the original CMYK$_O$ values to the ink limited CMYK$_L$ data values in the memory 52 (block 244). While the ink limited printer model does not use the CMYK$_L$ values, the CMYK$_L$ values can be used later in process 100 to generate a color profile mapping between the L*a*b* color space and CMYK colors that are used to form images in the printer 5.

Process 200 is an exemplary process for generating an ink limited printer model using the total ink mass density of inks that form each color on the print medium as a constraint to limit the L*a*b* colors that are included in the ink limited printer model. The printer 5 can also employ alternative processes that also generate an ink limited printer model using the non-linear relationships between ink mass density and color perceptibility to generate an ink limited printer model. For example, an alternative process can modify all of the CMYK color components. Additionally, an alternative process can identify modified color component values in a non-iterative manner instead of the iterative manner described in FIG. 2.

Figure 6A:
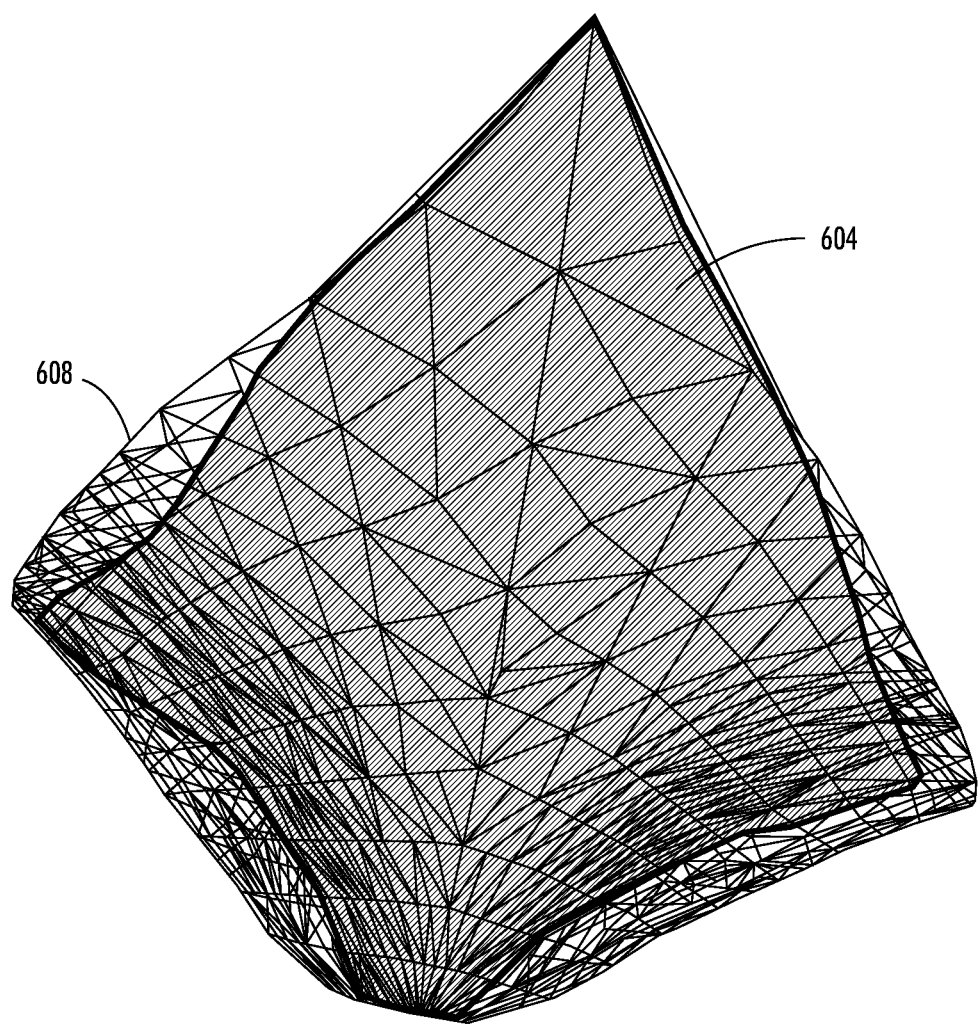
FIG. 6A is a diagram depicting a prior art ink limited color gamut and an expanded ink limited color gamut.
Figure 6B:
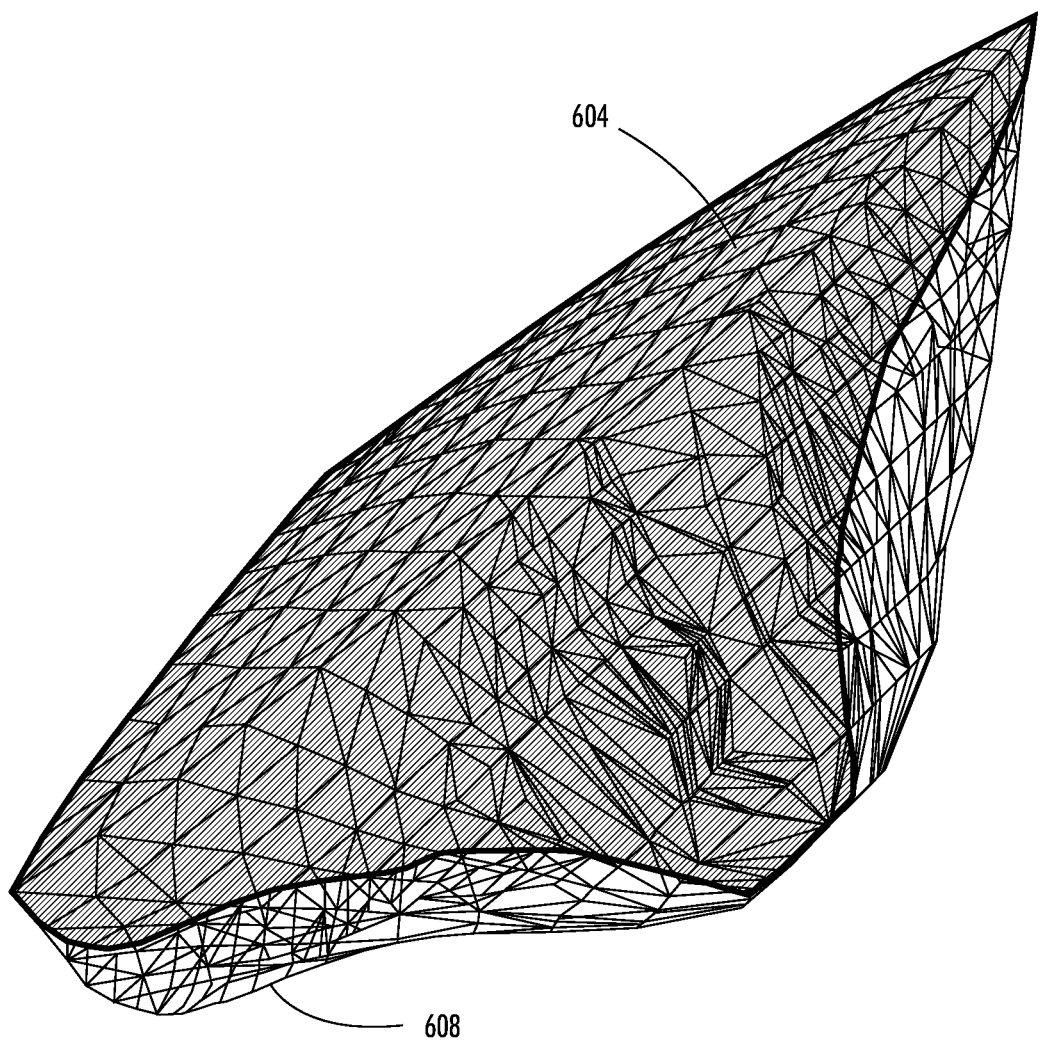
FIG. 6B is a diagram depicting another view of the prior art ink limited color gamut and an expanded ink limited color gamut of FIG. 6A.
Figure 6C:
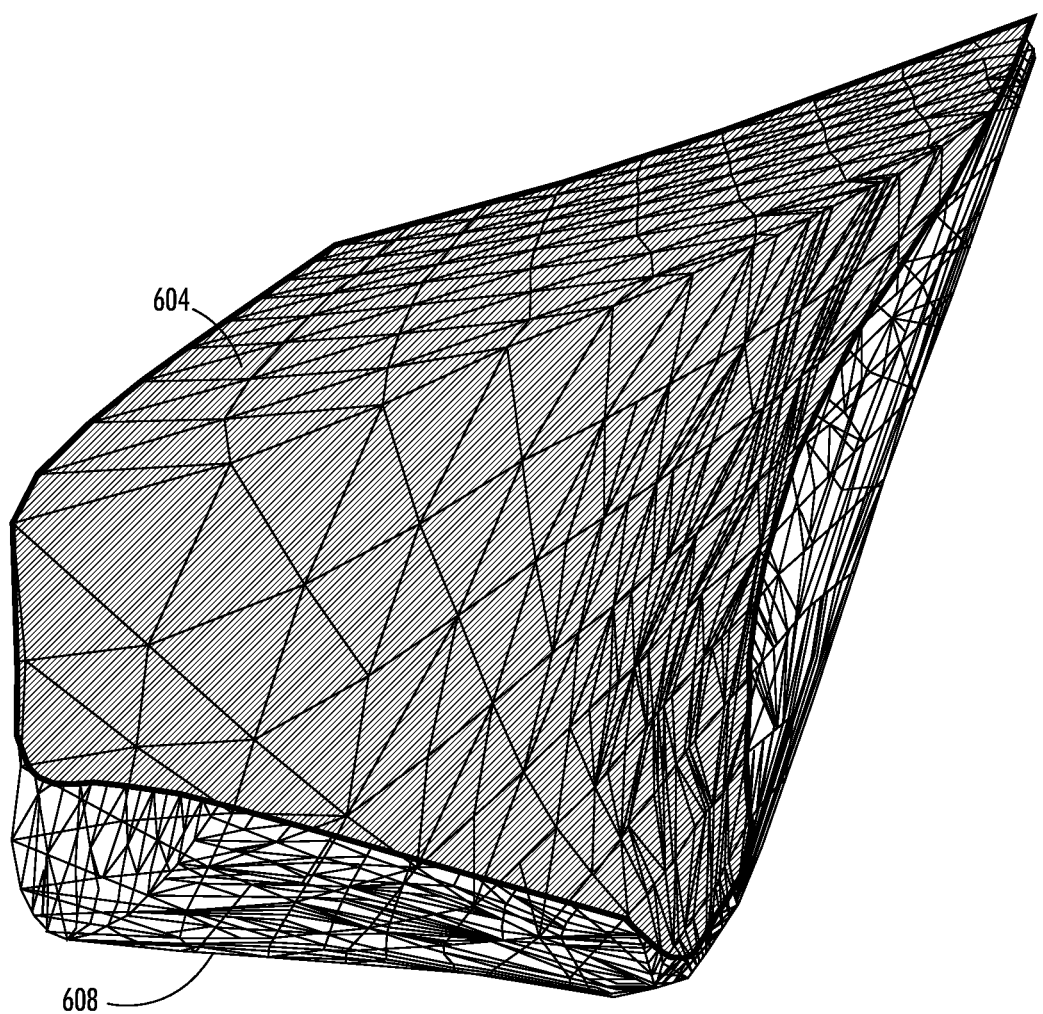
FIG. 6C is a diagram depicting another view of the prior art ink limited color gamut and an expanded ink limited color gamut of FIG. 6A and FIG. 6B.

Referring again to FIG. 1, process 100 identifies an ink limited color gamut in the L*a*b* color space that corresponds to the L*a*b* color coordinates in the ink limited color model (block 116). The L*a*b* coordinates can be visualized as a "point cloud" in the three dimensional L*a*b* color space. The ink limited color gamut refers to a range of colors in the L*a*b* color space that are encompassed by the point cloud. The ink limited color gamut is typically represented as a three dimensional object with an outer surface that is formed from a series of tessellated polygons, such as triangles, that corresponds to an outer boundary of the L*a*b* point cloud from the ink limited printer model. As depicted in FIG. 6A-6C, the mesh 608 depicts a three dimensional representation of an ink limited color gamut in a larger L*a*b* color space. The individual L*a*b* values in the ink limited printer model either lie within the volume or are on the surface of the ink limited gamut 608.

Various techniques can be used to form the three dimensional gamut object including a "rolling ball" technique. In the "rolling ball" technique, a sphere in the L*a*b* color space presses against points at the outer boundary of the point cloud. The sphere contacts three points in the point cloud, and the three points become vertices of a triangle. The sphere then rolls from contact with the first three points to contact different combinations of three points around the exterior of the point cloud, with each new combination of three points forming a new triangle. The result is a three dimensional ink limited gamut that contains all the L*a*b* coordinates in the ink limited printer model that is defined as a series of triangles. Existing geometric techniques can be used to identify coordinates in the L*a*b* space that are within the ink limited gamut and coordinates that lie outside the ink limited gamut in an efficient manner.

Process 100 continues by generating an inverted mapping between the colors in the L*a*b* color space and the CMYK values in the ink limited color model (block 120). In process 100, the L*a*b* color space is represented as a three dimensional matrix with each dimension of the matrix corresponding to one of the L*, a*, and b* coordinates. In one example, the L*a*b* matrix includes dimensions of 33 entries for each of the L*, a*, and b* coordinates for a total of 35,937 ($33^3$) entries. Another embodiment uses a wide gamut RGB color space as the device independent color space. A much larger number of L*a*b* colors and corresponding CMYK colors can be identified by interpolating between entries in the L*a*b* matrix. Each entry in the matrix stores a corresponding set of CMYK coordinates in the ink limited printer model. In the portion of the L*a*b* matrix that lies inside of the ink limited color gamut, the mapping back to the CMYK coordinates is a matter of reversing the ink limited color model to identify a CMYK coordinate given one of the L*a*b* coordinates already in the ink limited printer model. In some instances, a single L*a*b* color value corresponds to multiple CMYK coordinates in the ink limited model. When this occurs, existing color inversion techniques can be used to select one of the CMYK coordinates to associate with the L*a*b* coordinate for the L*a*b* to CMYK map.

As described above, however, the ink limited color gamut occupies only a portion of the larger L*a*b* color space represented by the L*a*b* matrix. Many of the L*a*b* entries do not directly map to a CMYK color in the ink limited printer model. Process 100 performs gamut mapping to identify another L*a*b* value that is part of the ink limited color gamut to approximate the L*a*b* value located outside of the ink limited gamut. Gamut mapping techniques are known in the art and are not described in detail in this document. Process 100 can be used with gamut mapping techniques that preserve the hue of the out-of-gamut L*a*b* colors when mapping to an in-gamut L*a*b* color. After the gamut mapping, the out-of-gamut L*a*b* color is assigned the same CMYK value from the ink limited printer model as the corresponding in-gamut L*a*b* color. Consequently, the process 100 generates a three dimensional matrix that represents a large L*a*b* color space with each entry in the matrix including CMYK coordinates that correspond to the ink limited printer model.

As described above in process 200, the LUT in the ink limited printer model includes CMYK entries that do not necessarily represent actual combinations of ink that a physical printer, such as printer 5, ejects to form ink images. The full color printer model of the printer 5, however, does include CMYK values that directly correspond to combinations of CMYK inks used to print ink images. Accordingly, process 100 next modifies some of the CMYK values in the L*a*b* to CMYK mapping so that the CMYK values correspond to an ink limited set of CMYK colors in the full color printer model of the printer 5 instead of in the ink limited printer model (block 124).

As noted above, the processing described above with reference to block 244 of process 200 enables the printer 5 to optionally store the ink limited $CMYK_L$ values from the full color printer model in the memory 52 in association with the $CMYK_O$ values of the ink limited printer model. For CMYK inks that have an ink mass density below the predetermined threshold for the printer, the $CMYK_O$ value in the ink limited printer model is the same as in the full color printer model. If, however, the ink mass density value $CMYK_O$ exceeds the predetermined ink mass density limit in the printer 5, then process 100 replaces the $CMYK_O$ value in the L*a*b* to CMYK matrix with the ink limited $CMYK_L$ value that was identified during process 200. In an alternative embodiment that does not cache $CMYK_O$ and $CMYK_L$ values, process 100 can perform the ink limiting transformation described in process 200 to generate ink limited CMYK values for entries in the L*a*b* matrix. Thus, the L*a*b* matrix maps coordinates in the L*a*b* color space to only CMYK colors that the printer 5 can print with an ink mass density that is below the predetermined limit for the printer.

Process 100 generates a color profile corresponding to the L*a*b* to CMYK mapping (block 128). The color profile mapping can be in different data formats including the ICC color profile format. An ICC profile represents the mapping from the L*a*b* space to the ink limited CMYK colors in the printer using "B2A" tags or in other color profile data formats that are recognized for use in printing. The printer 5 stores the color profile mapping data in the memory 52. During a printing operation, the controller 50 converts image data in another device independent color space, such as the sRGB color space, into the L*a*b* color space, or the controller 50 receives image data that are already encoded in the L*a*b* color space. The controller 50 uses the stored color profile mapping to identify CMYK ink combinations to use when printing the images corresponding to the L*a*b* color values of the image data. The printer 5 can print a CMYK ink combination for any color in the L*a*b* color space of the stored profile without exceeding the predetermined ink mass density limit of the printer.

Process 100 can be performed during manufacture of the printer or during operation of the printer. For example, a predetermined full color printer model can be stored in the memory 52 for all printers of a given type during manufacture. After the printer 5 is in operation, changes to the parameters of the components in the printer and changes to the operating environment can affect the perceived colors that are generated even using the same combinations of CMYK inks. The printer 5 performs process 100 to identify an appropriate ink limited printer model and a color profile that maps the ink limited printer model to perceived colors in the device independent color space to maintain accurate reproduction of colors in printed ink images.

Process 100 generates a color profile corresponding to an ink limited gamut that includes a wider range of colors than are produced with existing ink limiting techniques. For example, existing ink limiting processes limit colors in the gamut based on a worst-case scenario of the amount of ink used to generate any color with a predetermined image coverage percentage. Referring again to FIG. 5A and FIG. 5B, the coverage area percentage of two different colors are both 200%, but only the color in FIG. 5B exceeds the predetermined ink mass density threshold 504, while the color in FIG. 5A is below the threshold. Existing ink limiting techniques exclude both colors from the ink limited gamut even though the color in FIG. 5A has an ink mass density that would not interfere with the operation of the printer. The ink limited printer model in process 100, however, includes the corresponding L*a*b* values for the color in FIG. 5A, and the color profile generated in process 100 maps the wider ink limited gamut in the L*a*b* back to the CMYK color combination in FIG. 5A.

Process 100 generates an ICC profile that corresponds to a broader ink limited gamut by using the total ink mass density of printed colors to constrain the ink limited printer model. FIG. 6A-FIG. 6C depict different representations of a prior art ink limited gamut 604 inside of a broader ink limited gamut 608 that corresponds to the ICC profile generated with process 100. In FIG. 6A-FIG. 6C, the solid three dimensional object 604 represents the ink limited gamut generated by prior art ink limiting methods, and the mesh 608 represents the larger color gamut that is generated by process 100. The gamuts are depicted in an L*a*b* color space for illustrative purposes. The boundaries of the narrower color gamut 604 and broader color gamut 608 meet at locations where the percentage coverage limit of the prior art ink limited color gamut 604 happens to match the ink mass density threshold. The color gamut 608 is a superset of the prior art color gamut 604, which is to say that every color in the prior art color gamut 604 is included in the ink mass density limited color gamut 608.

Figure 3:
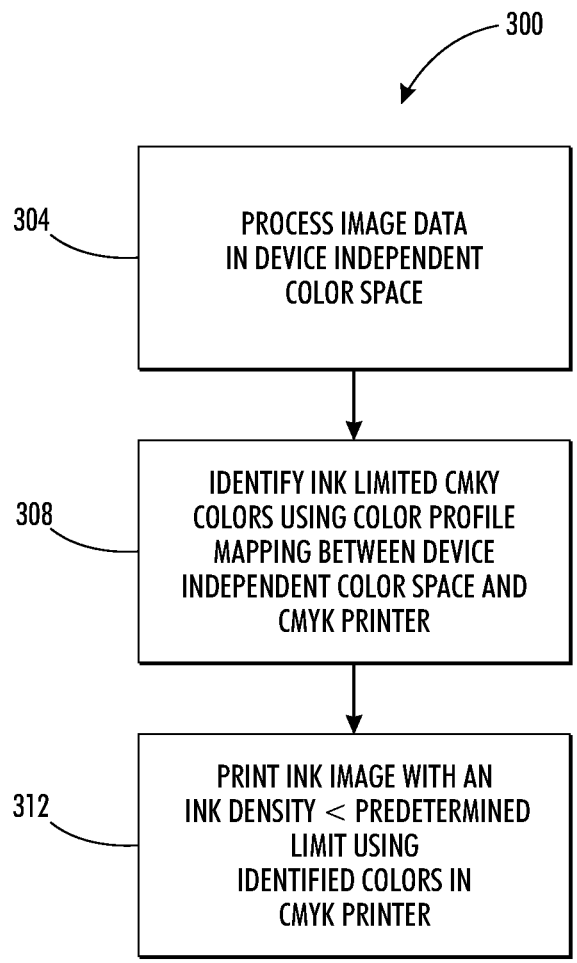
FIG. 3 is a block diagram of a process for printing an ink image using a color profile that is generated in the processes depicted in FIG. 1 and FIG. 2.

After the printer 5 has stored an ink limited ICC profile that maps the L*a*b* color space to the device dependent CMYK colors in the memory 52, the printer 5 can print images with ink limited CMYK colors corresponding to the colors in the L*a*b* color space. FIG. 3 depicts a process 300 of an imaging operation that uses the ink limited ICC profile. In the discussion below, a reference to the process performing a function or action refers to a controller executing programmed instructions stored in a memory to operate one or more components to perform the function or action, such as the controller 50 in the printer 5. Process 300 is described with reference to the printer 5 of FIG. 7 for illustrative purposes.

Process 300 begins when the printer 5 receives image data including color data encoded in a device independent color space (block 304). Examples of image data formats include page description languages (PDLs) such as Postscript or Portable Document Format (PDF), as well as rasterized image data such as color photographs or other images encoded in numerous formats including TIFF, JPEG, and PNG formats.

Process 300 identifies CMYK colors that correspond to the device independent colors in the image data using the ICC profile generated during process 100 (block 308). The ICC profile maps the L*a*b* color space to the CMYK colors that the printer 5 can print with an ink mass density that is below the predetermined limit for the printer. The image data include colors that are either encoded in the L*a*b* color space or can be converted from another color space, such as the sRGB color space, to the L*a*b* color space. The L*a*b* grid used in the B2A tag of the profile is chosen to encompass all the device independent color specifications in the input images.

After identifying CMYK ink colors that correspond to the colors in the image data, the printer 5 ejects ink drops from the printhead units 21A-21D to form printed ink images on the media web W (block 312). The printer 5 forms ink images with an ink density below the predetermined threshold that do not interfere with the handling of the print media or with the durability of ink images on the print media for any set of image data that are used during printing. The ICC profile generated in process 100 enables the printer 5 to generate ink images with an ink mass density below the operating limit for the printer without needing to perform additional processing or manipulations on the image data beyond the color conversion from the device independent color space to the ink limited printer model.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method of operating an inkjet printer comprising:
generating a first device dependent printer model that maps a plurality of colors formed from a plurality of inks in the printer and a first plurality of colors in a device independent color space;
generating a second device dependent printer model that maps the plurality of colors formed from the plurality of inks and a second plurality of colors in the device independent color space with reference to the first device dependent printer model, the second device dependent printer model including only colors in the device independent color space that correspond to colors formed from the plurality of inks with an ink mass density that is below a predetermined threshold;
generating a color profile mapping between the second plurality of colors in the device independent color space and the plurality of colors that are formed from the plurality of inks with an ink mass density that is below the predetermined threshold; and
storing the generated color profile mapping in a memory associated with the printer.

2. The method of claim 1, the generation of the second device dependent printer model further comprising:
identifying a plurality of ink mass densities for one color formed from the plurality of inks in the first device dependent printer model with reference to a plurality of color component values for the one color and with reference to a plurality of non-linear relationships between the plurality of color component values and the plurality of ink mass densities for each color component in the plurality of color components; and
identifying an ink mass density of the one color as a sum of the plurality of ink mass densities identified for the one color.

3. The method of claim 2 further comprising:
reducing a value corresponding to an ink mass density of at least one color component in the one color in response to the identified ink mass density of the one color exceeding the predetermined threshold;
identifying another color formed from the plurality of inks in the first device dependent printer model corresponding to the reduced ink mass values of the one color with reference to the plurality of non-linear relationships;
identifying a device independent color in the device independent color space corresponding to the other color in the first device dependent printer model; and
mapping the one color in the second device dependent printer model to the identified device independent color.

4. The method of claim 1, the plurality of inks including cyan, magenta, yellow, and black inks.

5. The method of claim 1, the device independent color space being an L*a*b* color space.

6. The method of claim 1, the device independent color space being a red, green, blue (RGB) color space.

7. The method of claim 1, the generation of the first device dependent printer model further comprising:
forming a plurality of marks on the print medium using the plurality of inks;
generating optical image data corresponding to the plurality of marks with an optical sensor; and
mapping a plurality of ink colors corresponding to the plurality of marks in the first device independent printer model to a plurality of colors in the device independent color space with reference to the optical image data.

8. The method of claim 1 wherein the optical sensor is a spectrophotometer.

9. The method of claim 1 further comprising:
identifying a color gamut in the device independent color space corresponding to the second plurality of colors in the device independent color space in the second device dependent printer mode;
identifying a color in the device independent color space that is outside of the color gamut; and
identifying one of the plurality of colors that are formed from the plurality of inks with an ink mass density that is below the predetermined threshold to approximate the color in the device independent color space that is outside of the color gamut with reference to the color gamut, the second device specific printer model, and the first device specific printer model.

10. The method of claim 1 further comprising:
identifying a plurality of colors in color image data corresponding to the device independent color space;
identifying a plurality of the colors formed from the plurality of inks corresponding to the plurality of colors in the image data with reference to the color profile mapping; and
ejecting the plurality of inks onto the print medium to form a printed ink image with the identified plurality of colors formed from the plurality of inks, the printed ink image having an ink mass density that is below the predetermined threshold.

11. An inkjet printer comprising:
a plurality of inkjets arranged in a print zone and configured to form ink images with a plurality of inks on a print medium;
a memory associated with the printer and configured to store:
a color profile mapping between a plurality of colors in a device independent color space and a plurality of ink colors formed from the plurality of inks, the plurality of ink colors only including colors that are formed with an ink mass density that is below a predetermined threshold; and
a controller operatively connected to the plurality of inkjets and the memory, the controller being further configured to:
identify a plurality of colors in color image data corresponding to the device independent color space;
identify a plurality of the ink colors corresponding to the plurality of colors in the color image data with reference to the color profile mapping; and
operate the plurality of inkjets to eject the plurality of inks onto the print medium to form a printed ink image with the identified plurality of ink colors, the printed ink image having an ink mass density that is below the predetermined threshold.

12. The printer of claim 11, the plurality of inks including cyan, magenta, yellow, and black inks.

13. The printer of claim 11, the device independent color space being an L*a*b* color space.

14. The printer of claim 11, the device independent color space being a red, green, blue (RGB) color space.

15. The printer of claim 11 wherein the ink mass density threshold is approximately 6 mg of ink per square inch on a surface of the print medium.

16. The printer of claim 11 further comprising:
an optical sensor configured to generate scanned image data with reference to light reflected from the plurality of inks on the print medium; and
the controller being operatively connected to the optical sensor and further configured to:
operate the plurality of inkjets to form a plurality of ink marks on the print medium; and
identify a full color printer model from scanned image data that maps a plurality of colors of the plurality of ink marks to a plurality of colors in the device independent color space, the full color printer model including at least one color formed from the plurality of inks on the print medium with an ink mass density that is above the predetermined threshold.

17. The printer of claim 16, the controller being further configured to:
generate an ink limited printer model corresponding to the plurality of ink colors in the full color printer model and a plurality of colors in the device independent color space that correspond only to ink colors in the full color printer model with an ink mass density that is below the predetermined threshold.

18. The printer of claim 17, the controller being further configured to:
identify a plurality of ink mass densities for one ink color in the full color printer model with reference to a plurality of color component values for the one ink color and with reference to a plurality of non-linear relationships between the plurality of color component values and the plurality of ink mass densities for each color component in the plurality of color components; and
identify an ink mass density of the one ink color as a sum of the plurality of ink mass densities identified for the one color.

19. The printer of claim 18, the controller being further configured to:
reduce a value corresponding to an ink mass density of at least one color component in the one ink color in response to the identified ink mass density of the one color exceeding the predetermined threshold;
identify another color formed from the plurality of inks in the full color printer model corresponding to the reduced ink mass values of the one ink color with reference to the plurality of non-linear relationships;
identify a device independent color in the device independent color space corresponding to the other color in the first device dependent printer model; and
associate the identified device independent color with color component values of the one ink color in the ink limited printer model.

20. The printer of claim 17, the controller being further configured to:
generate the color profile mapping with reference to the ink limited printer model and the full color printer model.

* * * * *